US007493144B2

(12) United States Patent
Natarajan et al.

(10) Patent No.: US 7,493,144 B2
(45) **Date of Patent: *Feb. 17, 2009**

(54) MULTI-ELEMENT PHASED ARRAY TRANSMITTER WITH LO PHASE SHIFTING AND INTEGRATED POWER AMPLIFIER

(75) Inventors: Arun Natarajan, Pasadena, CA (US); Abbas Komijani, Los Angeles, CA (US); Seyed Ali Hajimiri, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/778,419

(22) Filed: Jul. 16, 2007

(65) Prior Publication Data

US 2008/0058019 A1 Mar. 6, 2008

Related U.S. Application Data

(63) Continuation of application No. 11/241,875, filed on Sep. 29, 2005, now Pat. No. 7,260,418.

(60) Provisional application No. 60/614,390, filed on Sep. 29, 2004.

(51) Int. Cl.
*H04B 1/38* (2006.01)
*H04M 1/00* (2006.01)

(52) U.S. Cl. .................... 455/562.1; 455/101; 455/103; 375/299

(58) Field of Classification Search .............. 455/550.1, 455/561, 562.1, 101, 103, 118; 375/299; 332/103, 105, 144, 146
See application file for complete search history.

(56) References Cited

U.S. PATENT DOCUMENTS

| | | | |
|---|---|---|---|
| 6,466,165 | B2 | 10/2002 | Obayashi |
| 6,784,836 | B2 | 8/2004 | Kasperkovitz et al. |
| 7,043,271 | B1 | 5/2006 | Seto et al. |

(Continued)

OTHER PUBLICATIONS

Hashemi et al., "A 24 GHz SiGe Phased-Array Receiver: LO Phase Shifting Approach," Expanded version of the RFIC '04 paper # 1516 for the special MTT Transaction issue, Nov. 2004.

*Primary Examiner*—Nguyen Vo
(74) *Attorney, Agent, or Firm*—Townsend and Townsend and Crew LLP; Kenneth R. Allen

(57) ABSTRACT

A fully integrated CMOS multi-element phased-array transmitter (transmitter) includes, in part, on-chip power amplifiers (PA), with integrated output matching. The transmitter is adapted to be configured as a two-dimensional 2-by-2 array or as a one dimensional 1-by-4 array. The transmitter uses a two step up-conversion architecture with an IF frequency of 4.8 GHz. Double-quadrature architecture for the up-conversion stages attenuates the signal at image frequencies. The phase selectors in each transmitter path have independent access to all the phases of the VCO. The double quadrature architecture results in two sets of phase selectors for each path, one for the in-phase (I) and one for the quadrature phase (Q) of the LO signal. The phase selection is done in two stages, with the first stage determining the desired VCO differential phase pair and the next stage selecting the appropriate polarity. An on-chip Balun is used for differential to single-ended conversion.

18 Claims, 4 Drawing Sheets

U.S. PATENT DOCUMENTS

| | | | | |
|---|---|---|---|---|
| 7,079,869 | B2 | 7/2006 | Aytur et al. | |
| 7,260,418 | B2 * | 8/2007 | Natarajan et al. | 455/562.1 |
| 2002/0033768 | A1 | 3/2002 | Neeman et al. | |
| 2002/0094047 | A1 * | 7/2002 | Agazzi | 375/355 |
| 2002/0111149 | A1 | 8/2002 | Shoki | |
| 2002/0169758 | A1 | 11/2002 | Yang | |
| 2003/0011519 | A1 | 1/2003 | Breglia et al. | |
| 2003/0107517 | A1 | 6/2003 | Keda et al. | |
| 2004/0087294 | A1 | 5/2004 | Wang | |
| 2005/0113035 | A1 | 5/2005 | Kyongyop | |

* cited by examiner

MULTI-ELEMENT PHASED ARRAY TRANSMITTER WITH LO PHASE SHIFTING AND INTEGRATED POWER AMPLIFIER

CROSS-REFERENCES TO RELATED APPLICATIONS

The present application is a continuation of application Ser. No. 11/241,875, filed Sep. 29, 2005, now U.S. Pat. No. 7,260, 418 issued Aug. 21, 2007, which claims benefit under 35 USC 119(e) of U.S. provisional Application No. 60/614,390, filed Sep. 29, 2004 entitled "Multi-Element Phased Array Transmitted With LO Phase Shifting And Integrated Power Amplifier," the content of which is incorporated herein by reference in its entirety.

The present application is also related to U.S. application Ser. No. 10/988,199, filed Sep. 12, 2004, entitled "Monolithic Silicon-Based Phased Arrays For Communications And Radars," the content of which is incorporated herein by reference in its entirety.

BACKGROUND OF THE INVENTION

The present invention relates to wireless communications, and in particular to a phased-array transmitter adapted for use in wireless communication systems.

Omni-directional communication systems have been used extensively in various applications due, in part, to their insensitivity to orientation and location. Such systems, however, have a number of drawbacks. For example, the transmitter in such systems radiates electromagnetic power in all directions, only a small fraction of which reaches the intended receiver; this results in a considerable amount of waste in the transmitted power. Thus, for a given receiver sensitivity, a relatively higher electromagnetic power needs to be radiated by an omni-directional transmitter as compared to a directional transmitter. Furthermore, because the electromagnetic propagation is carried out in all directions, the effects of phenomenon such as multi-path fading and interference are more pronounced.

In a single-directional communication system, power is only transmitted in one or more desirable directions. This is commonly achieved by using directional antennas (e.g., a parabolic dish) that provide antenna gain for some directions, and attenuations for others. Due to the passive nature of the antenna and the conservation of energy, the antenna gain and its directionality are related; a higher antenna gain corresponds to a narrower beam width and vice versa. Single-directional antennas are often used when the relative location and orientation of the transmitter and receiver are known in advance and do not change quickly or frequently. For example, this may be the case in fixed-point microwave links and satellite receivers. Additional antenna gain at the transmitter and/or receiver of such a communication system may improve the signal-to-noise-plus-interference ratio (SNIR), and thereby increase the effective channel capacity. However, a single-directional antenna is typically not well adapted for portable devices whose orientation may require fast and frequent changes via mechanical means.

Multiple antenna phased-array systems may be used to mimic a directional antenna with a bearing adapted to be electronically steered without requiring mechanical movement. Such electronic steering provides advantages associated with the antenna gain and directionality, while concurrently eliminating the need for mechanical reorientation of the antenna. Moreover, the multiple antennas disposed in phased-array systems alleviate the performance requirements for the individual active devices disposed therein, and thus make these systems more immune to individual device failure.

Multiple antenna phased-array systems (hereinafter alternatively referred to as phased-arrays) are often used in communication systems and radars, such as multiple-input-multiple-out (MIMO) diversity transceivers and synthetic aperture radars (SAR). Phased arrays enable beam and null forming in various directions. However, conventional phased-arrays require a relatively large number of microwave modules, adding to their cost and complexity.

Higher frequencies offer more bandwidth, while reducing the required antenna size and spacing. The industrial, scientific, and medical (ISM) bands at 24 GHz, 60 GHz are suited for broadband communication using multiple antenna systems, such as phased-arrays, and the 77 GHz band is suited for automotive RADARS. Furthermore, the delay spread at such high frequency bands is smaller than those of lower frequency bands, such as 2.4 GHz and 5 GHz, thus rendering such high frequency bands more effective for indoor uses, allowing higher data rates. A ruling by the FCC has opened the 22-29 GHz band for automotive radar systems, such as autonomous cruise control, in addition to the already available bands at 77 GHz.

A phased-array receiver includes a multitude of signal paths each connected to a different one of a multitude of receive antennas. The radiated signal is received at spatially-separated antenna elements (i.e., paths) at different times. A phased-array is adapted to compensate for the time difference associated with the receipt of the signals at the multitude of paths. The phased-array combines the time-compensated signals so as to enhance the reception from the desired direction(s), while concurrently rejecting emissions from other directions.

In a phased-array transmitter, each element radiates the same signal delayed by different time intervals. As shown in FIG. 1, the transmitted outputs add up coherently in the desired direction, increasing the signal power. Incoherent addition of the outputs in other directions attenuates the signal power resulting in reduced interference at receivers that are not targeted.

RF phase-shifting is unsuitable in the transmit path due to nonlinearity and variability of gain with phase-shift. Large physical size of passive components render analog phase shifting unfeasible at low frequencies. High power requirements of additional digital-to-analog converters (DACs) and high-speed digital signal processor (DSPs) preclude digital base band phase shifting

SUMMARY OF THE INVENTION

A fully integrated CMOS multi-element phased-array transmitter, in accordance with the present invention, includes, in part, on-chip power amplifiers (PA), with integrated output matching. In one embodiment, the phased-array operates at 24 GHz supporting bit rates of 500 Mb/s—limited by measurement setup.

The architecture of the multi-element phased-array transmitter (hereinafter alternatively referred to as transmitter) is adapted to provide flexibility to configure the transmitter as a two-dimensional 2-by-2 array or as a one dimensional 1-by-4 array. The transmitter uses a two step up-conversion architecture with an IF frequency of 4.8 GHz, in one embodiment. Double-quadrature architecture for the up-conversion stages attenuates the signal at image frequencies.

In one embodiment, a 16-phase 19.2 GHz CMOS VCO that includes eight differential amplifiers with tuned loads connected in a ring structure, generates 16 phases of the local oscillator (LO) signal with steps of 22.5° for LO phase-shifting. A single frequency synthesizer loop generates LO frequencies for both up-conversion stages (19.2 GHz and 4.8 GHz) from a 75 MHz reference.

The phase selectors in each transmitter path have independent access to all the phases of the VCO. The double quadrature architecture results in two sets of phase selectors for each path, one for the in-phase (I) and one for the quadrature phase (Q) of the LO signal. The phase selection is done in two stages, with the first stage determining the desired VCO differential phase pair and the next stage selecting the appropriate polarity. The phase selectors can also be used as phase interpolators by selecting more than one phase pair at a time, thereby generating phases with resolution finer than 22.5°. The distribution of the multiple phases of the LO signal to the phase selectors in each path is carried out in a highly symmetric fashion to inhibit asymmetry in the LO signal. As is known, any asymmetry increases the power in the side-lobes, generates interference and clutter for radar and communication systems. Symmetric floorplanning and an H-tree based distribution structure ensure symmetry of the LO signals at each transmitter path. The configuration of the transmitter, including the beam-steering information is set through a digital serial interface.

The base band input signals I and Q drive a pair of double-balanced Gilbert type mixers in quadrature. The first set of mixers up-convert the base-band signal to 4.8 GHz. These mixers are followed by in-phase and quadrature signal buffers. An H-tree structure distributes the outputs of the 4.8 GHz buffers to the 4.8 GHz-to-24 GHz up-conversion mixers in each path. The outputs of the second up-conversion mixers are buffered and supplied to the PA driver. The cascode of tuned stages in the signal path increases the sensitivity of the transmitter to the frequency tuning of the passive tuned loads. Digitally switchable capacitors at the outputs of some of the high frequency tuned stages enable the adjustment of the center frequencies of these stages. The state of the switches is part of the initial digital calibration data loaded onto the chip.

Since all the circuits in the signal path up to, and including, the PA driver are differential while the two-stage PA is single-ended, an on-chip Balun is used for differential to single-ended conversion. The passive Balun is realized with a single-turn transformer to reduce substrate loss.

DETAILED DESCRIPTION OF THE INVENTION

A fully integrated CMOS multi-element phased-array transmitter, in accordance with the present invention, includes, in part, on-chip power amplifiers (PA), with integrated output matching. In one embodiment, the phased-array operates at 24 GHz supporting bit rates of 500 Mb/s.

Figure 2:
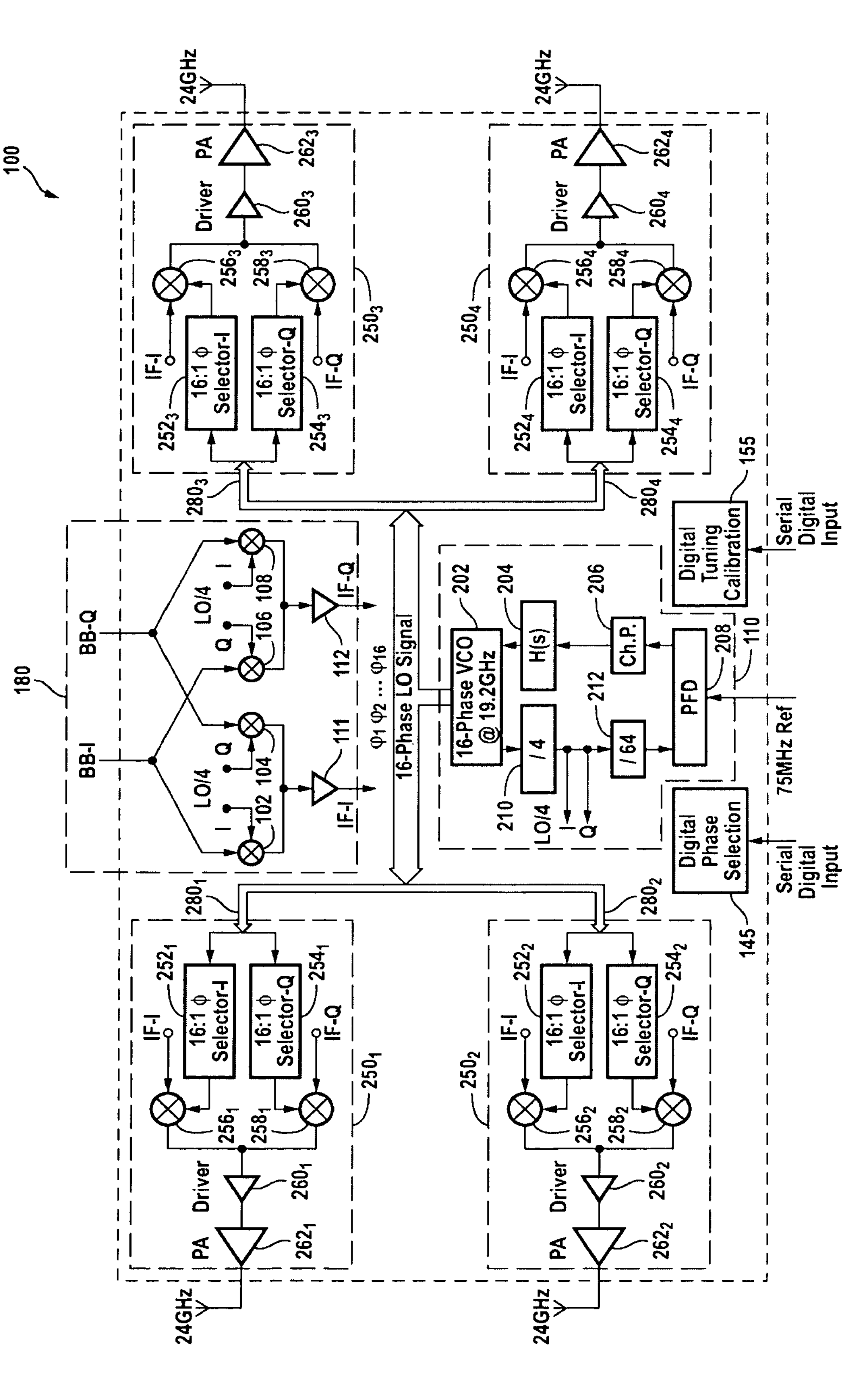
FIG. 2 is a high-level architecture and floorplan diagram of an exemplary multi-element phased-array transmitter, in accordance with one embodiment of the present invention.

FIG. 2 is a high-level architecture and floorplan diagram of an exemplary multi-element phased-array transmitter 100, in accordance with one embodiment of the present invention. The architecture of the multi-element phased-array transmitter (hereinafter alternatively referred to as transmitter) 100 provides the flexibility to configure the transmitter as a two-dimensional 2-by-2 array or as a one dimensional 1-by-4 array. The transmitter uses a two step up-conversion architecture with an IF frequency of, for example 4.8 GHz in one embodiment. The double-quadrature architecture for the up-conversion stages attenuate the signal at image frequencies. A 16-phase CMOS VCO that includes eight differential amplifiers with tuned loads connected in a ring structure, generates 16 phases of the local oscillator (LO) signal with steps of 22.5° for LO phase-shifting. A single frequency synthesizer loop generates LO frequencies for both up-conversion stages, namely 19.2 GHz and 4.8 GHz, from a 75 MHz reference clock. The local oscillator phases applied to the RF mixers, described below, may be arbitrary phases of the local oscillator and thus may continuously vary.

Phased-array transmitter 100 is shown as being a 4-element phase array. It is understood, however, that a phased-array transmitter, in accordance with the present invention may have more, e.g., 16, or fewer, e.g., 2, elements. Phased-array transmitter 100 is adapted so as to be fully integrated on a single silicon substrate. As such, phased-array transmitter 100 facilitates on-chip functions, such as signal processing and conditioning, thus obviating the need for such off-chip functions. Furthermore, phased-array transmitter 100 has a relatively smaller size and cost of manufacture, consumes less power, and has an enhanced reliability. Phased-array transmitter 100 is adapted to be operable at relatively high frequencies, such as 24 GHz, and enables phase-shifting with 22.5° resolution at the local oscillator (LO) port of the first up-conversion mixer.

Exemplary 100 is shown as including, in part, a phase generator 110, an IF mixing block 180, and four transmission blocks (elements) $\mathbf{250}_1$. In the following, different instances of similar components are alternatively identified by similar reference numerals having different indices—the indices appear as subscripts to the reference numerals. For example, the four shown instances of transmission blocks are alternatively identified as $\mathbf{250}_1$, $\mathbf{250}_2$, $\mathbf{250}_3$, and $\mathbf{250}_4$. Alternatively the transmission blocks may be identified with reference numeral 250. Each transmission block 250 further includes, in part, a pair of phase selection blocks 252, 254, a pair of RF mixers 256, 258, a driver 260, and a power amplifier 262.

IF mixing block 180 is shown as including, in part, four IF mixers 102, 104, 106, and 108, and a pair of buffers 111, and 112. Signals I and Q, which have a 90° phase shift with respect to one another and are generated by dividing the frequency of the locked LO clock by four—using divide-by-four block 210—are applied to the IF mixing block 180. In-phase signal I is applied to mixers 102 and 108 of mixing block 180. Quadrature phase signal Q is applied to mixers 104 and 106 of mixing block 180. The in-phase signal BB-I of a base band signal is also applied to mixers 102, 106. The quadrature signal BB-Q of the base band signal is applied to mixers 104, 108. IF mixers 102, 104 shift the phase of the base band signals they receive and upconvert the frequency of the received baseband signal to generate an IF signal IF-I. IF mixers 106, 108 shift the phase of the baseband signals they receive and upconvert the frequency of the received base band signal to generate an IF signal IF-Q. Signals IF-I and IF-Q have a 90 degrees phase shift with respect to one another. Signal IF-I is buffered by buffer 111, and signal IF-Q is buffered by buffer 112. In one embodiment, each mixer in IF mixing block 180 is a double-balanced Gilbert type mixer adapted to up-convert the base-band signal to an IF signal, such as a 4.8 GHz signal. An H-tree structure distributes the outputs of the 4.8 GHz buffers to the 4.8 GHz-to-24 GHz up-conversion mixers in each path.

Phase generator 110 is shown in FIG. 2 as being a phased-locked loop circuit. It is understood that phase generator 110 may be a delay-locked loop or any other closed-loop control circuit adapted to lock to the phase or frequency of the reference clock signal Ref. Phase generator 110 is shown as including in part, a voltage-controlled oscillator (VCO) 202, a loop filter 204, a charge pump 206, a phase-frequency detector 208, a divide-by-four block 210, and a divide-by-64 block 212. The 16 phase signals $\phi_1, \phi_2, \ldots, \phi_{16}$ are generated by VCO 202 and supplied to each of the phase selectors 252, and 254 of each of the transmission elements.

Phase-generator 110, which is a closed-loop control circuit, is adapted to lock a 19.2 GHz local oscillator clock, after the oscillator clock is divided by 256, to the reference clock Ref, which is a 75 MHz clock. Phase-generator 110 generates and applies 16 generated phases $\phi_1, \phi_2, \ldots, \phi_{16}$ of the locked 19.2 GHz clock signal to phase selection blocks 252 and 254 of each transmission block 250. In some embodiments, each of the generated phase $\phi_1, \phi_2, \ldots, \phi_{16}$ is a differential signal having a differentially positive signal and a differentially negative signal (not shown). For example, in such embodiments, phase signal $\phi_1$ includes a pair of signals, namely a differentially positive signal $\phi^+_1$ and a differentially negative signal $\phi^-_1$. It is understood that the 16 generated phases $\phi_1, \phi_2, \ldots, \phi_{16}$ of the local oscillator may be arbitrary phases of the local oscillator and thus may continuously vary. Each transmission path 280 is supplied with independent access to the 16 phases of the LO signal, thereby providing each I and Q phase selector (252$_i$ and 254$_i$) with independent access to the LO phases. Independent generation of in-phase and quadrature phase LO signals increases control over phase selection where due to factors such as, signal distribution, coupling, etc., the generated phases $\phi_1, \phi_2, \ldots, \phi_{16}$ may not be exactly 22.5 degrees apart.

In one embodiment, VCO 202 which generates the 16 phases of the LO clock, includes a ring of eight differential CMOS amplifiers with tuned loads. The center frequency of the VCO in such embodiments is locked by a third-order frequency synthesizer to the 75 MHz reference clock Ref. The LO phases are distributed to phase selectors 252$_i$ and 254$_i$ of each of the 4 paths through a symmetric binary tree structure, thereby providing each path with an independent access to each of the phases $\phi_1, \phi_2, \ldots, \phi_{16}$ of the LO.

Phase selector 252$_i$ disposed in each transmission block 250$_1$ is adapted to select one of 16 the in-phases of the LO signal delivered thereto via transmission path 280$_i$ and supply the selected phase signal to an associated mixer 256$_i$, where in this exemplary embodiment i is an integer varying from 1 to 4. Similarly, phase selector 254$_i$ disposed in each transmission block 250$_i$ is adapted to select one of 16 phases of the LO signal delivered thereto via transmission path 280$_i$ and supply the selected phase signal to an associated mixer 258$_i$. Phase selectors 252$_i$ and 254$_i$ in each transmission 280$_i$ path have independent access to all the phases of the VCO.

As described above, the double quadrature architecture results in two sets of phase selectors for each path, one for the in-phase and one for the quadrature phase of LO signal. The phase selection is done in two stages, with the first stage determining the desired VCO differential phase pair and the next stage selecting the appropriate polarity. The phase selectors can also be used as phase interpolators by selecting more than one phase pair at a time, thereby generating phases with resolution finer than 22.5°. The distribution of the multiple phases of the LO signal to the phase selectors in each path is carried out in a highly symmetric fashion to inhibit asymmetry in the LO signal. Such asymmetry increases the power in the side-lobes and generates interference and clutter for radar and communication systems. Symmetric floorplanning and an H-tree based distribution structure ensure symmetry of the LO signals at each transmitter path. The configuration of the transmitter, including the beam-steering information is set through digital serial interfaces 145 and 155.

Signal IF-I generated by IF mixing block 180 is applied to each of the IF mixers 256$_i$, and signal IF-Q generated by IF mixing block 180 is applied to each of the IF mixers 258$_i$. Mixers 256$_i$ and 258$_i$ up-convert the frequency of the received signals from IF to RF signals and supply the up-converted RF signals to an associated driver 260$_i$. Driver 260$_i$ disposed in each transmission block 250 supplies an output signal to an associated power amplifier 262$_i$ disposed in the same block.

Figure 1:
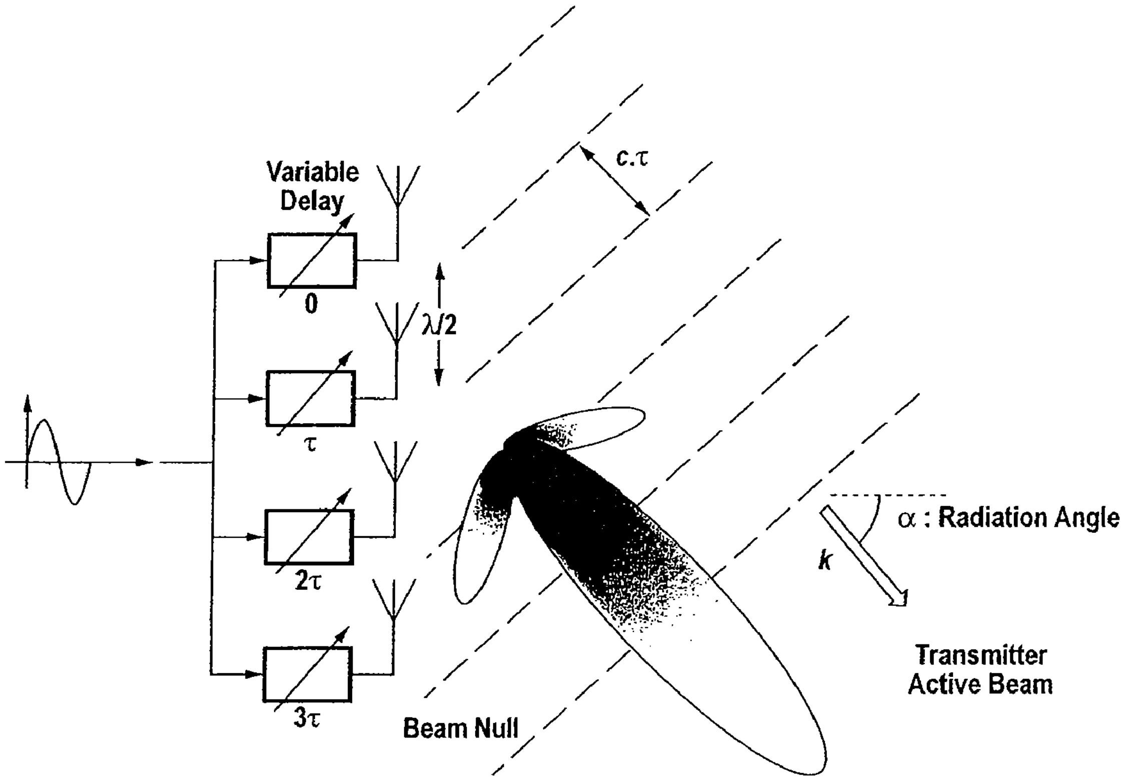
FIG. 1 shows signals transmitted from a multi-antenna system.
Figure 3:
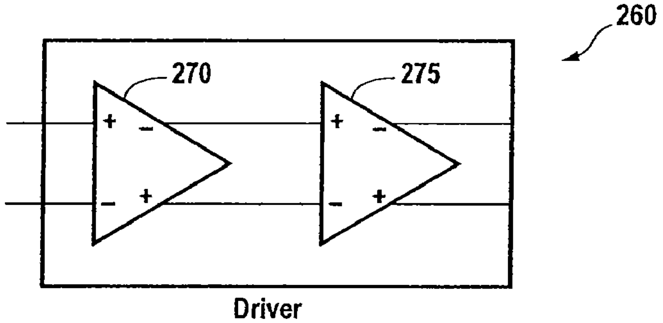
FIG. 3 is high-level block diagram of the driver of the phased-array transmitter of FIG. 2, in accordance with one embodiment of the present invention.
Figure 4:
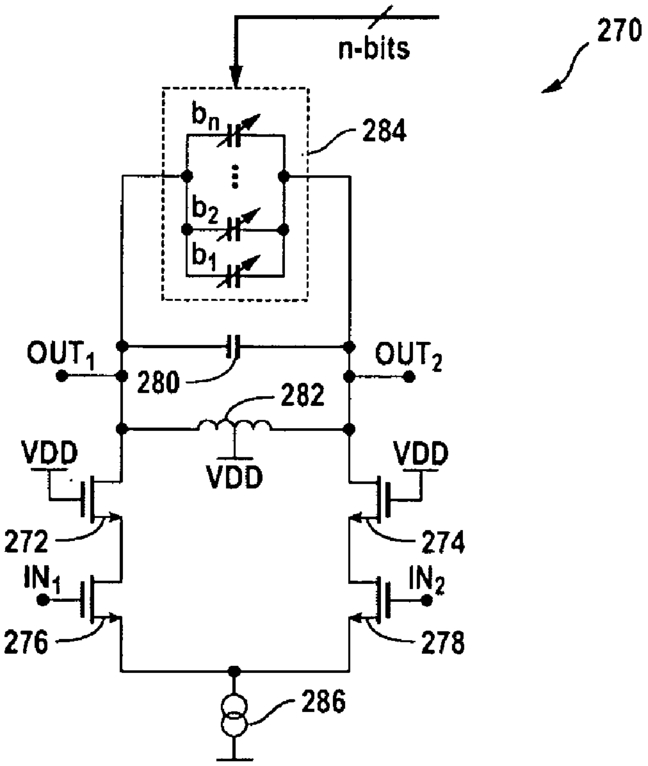
FIG. 4 is a transistor schematic diagram of the first stage of the driver of FIG. 3, in accordance with one embodiment of the present invention.

FIG. 3 is a high-level block diagram of each driver 260. As seen each driver 260 includes a first driving stage 270, and a second driving stage 275. FIG. 4 is a transistor schematic diagram of first driving stage 270, in accordance with one embodiment of the present invention. First driving stage 270 of driver 260 receives a pair of differential signals via input terminals $IN_1$ and $IN_2$, and supplies a pair of differential output signals via terminals $OUT_1$ and $OUT_2$. Inductor 282, together with fixed capacitor 280, and variable capacitor block 284 provide a load to driving stage 270. Bits $b_1$, $b_2$. . . $b_n$ supplied by digital tuning calibration block 155, shown in FIG. 2, are adapted to switch on or off an associated capacitor disposed in variable capacitor block 284 to adjust the center frequency of the differential amplifier of driving stage 270 to ensure that gain loss is kept at minimum. Each group of n-bits supplied by digital tuning calibration block 155 is used to adjust the center frequency of a different one of the 4 driving stages 270.

Figure 5:
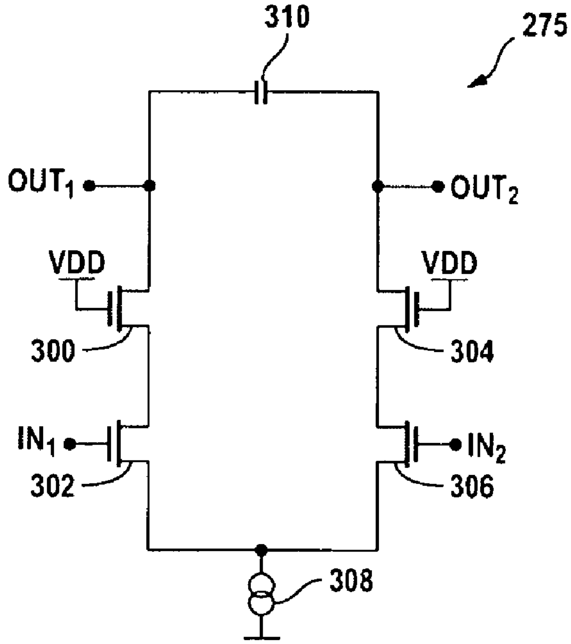
FIG. 5 is a transistor schematic diagram of the second stage of the driver of FIG. 3, in accordance with one embodiment of the present invention.

FIG. 5 is a transistor schematic diagram of second driving stage 275, in accordance with one embodiment of the present invention. Second driving stage 275 of driver 260 receives a pair of differential signals via input terminals $IN_1$ and $IN_2$, and supplies a pair of differential output signals via terminals $OUT_1$ and $OUT_2$. Fixed capacitor 310, as well as Balun 620 shown in FIG. 6 and described below, provide a load to driving stage 275.

Figure 6:
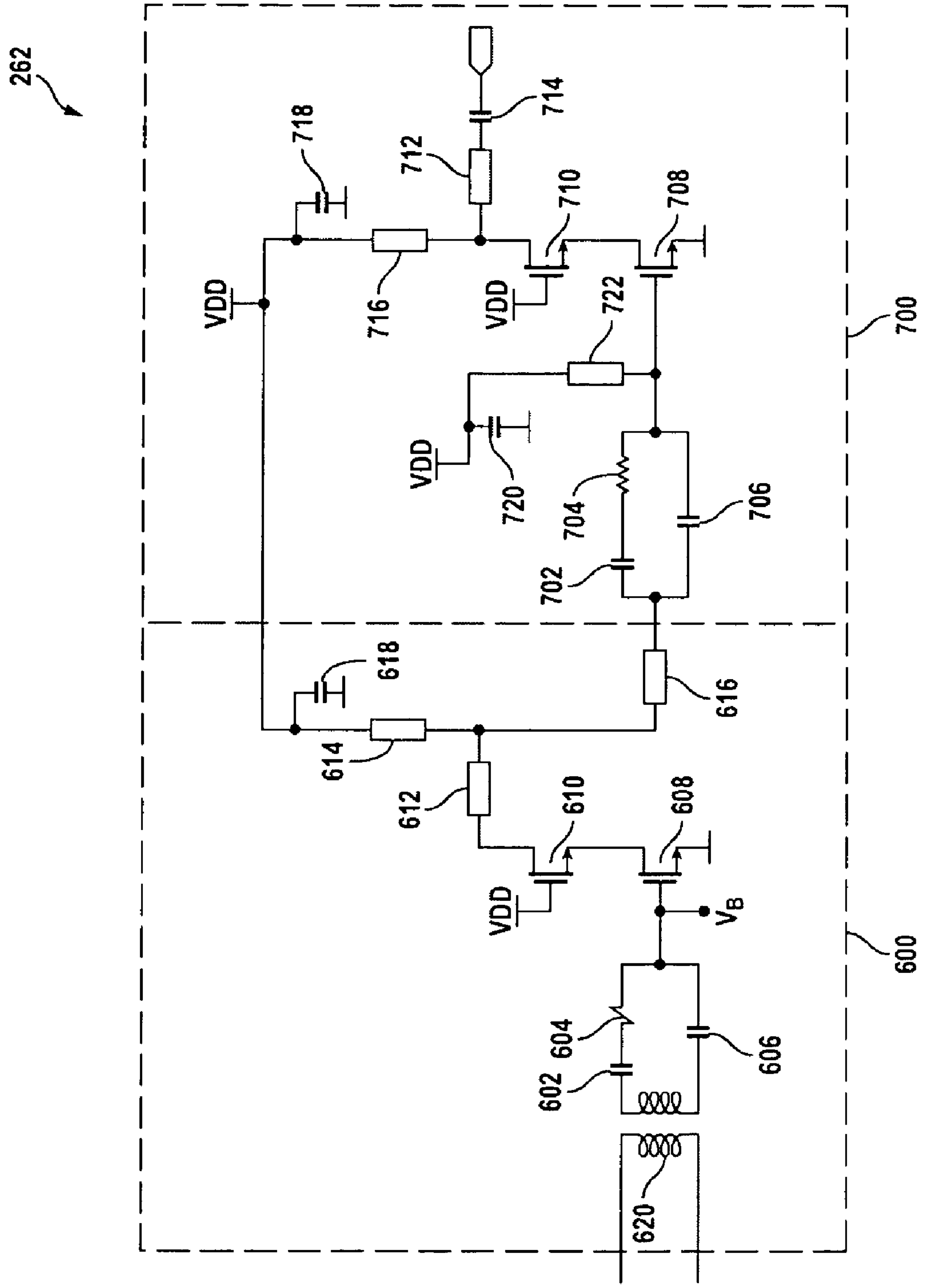
FIG. 6 is a transistor schematic diagram of the power amplifier of the phased-array transmitter of FIG. 2, in accordance with one embodiment of the present invention.

FIG. 6 is a schematic diagram of power amplifier 262, in accordance with one embodiment of the present invention. Power amplifier 262 includes a first amplification stage 600, and a second amplification stage 700. Amplification stage 600 is shown as including Balun 620—which provides a load to driving stage 275—resistor 604, capacitors 602, 606, 618, lambda transmission lines 612, 614, and transistors 608, and 610. Amplification stage 700 is shown as including resistor 704, capacitors 702, 706, 718, 720, lambda transmission lines 712, 716, 722, and transistors 708, 710.

Transistors 608, 610 form a cascode amplifier. Capacitor 606 acts as a short at high frequencies, thereby enabling the AC component of the signals to reach transistor 608, while blocking the DC components. At lower frequencies, as the impedance of capacitor 606 becomes comparable to the resistance of resistor 604, part of the signal received from driver 260 passes through resistor 604. This, in turn, reduces the gain of amplification stage 600 thus rendering amplification stage 600 stable. Capacitor 602 continues to block the DC component of the received signals. Capacitor 618 provides a short to the supply voltage VDD at RF frequencies. Transmission lines 614 and 612 serve to match the output of the transistor 610 to the load presented by the series combination of transmission line 616 and the input impedance of amplification stage 700.

Transistors 708 and 710 form a cascode amplifier. Capacitor 706 acts as a short at high frequencies, thereby enabling the AC component of the signals to reach transistor 708, while blocking the DC components. At lower frequencies, as the impedance of capacitor 706 becomes comparable to the resistance of resistor 704, part of the signal received from driver amplification stage 600 passes through resistor 704. This, in turn, reduces the gain of amplification stage 700 thus rendering amplification stage 700 stable. Capacitor 702 continues to block the DC component of the received signals. Capacitor 718 provides a short to the supply voltage VDD at RF frequencies. This places transmission line 716 in parallel with the output of transistor 710, thereby resonating out the output capacitance of transistor 710. Transmission line 712 is adapted to provide impedance matching. Capacitor 714 is adapted to isolate the DC components of the output signal of amplification stage 700 from reaching the external line, such as an antenna and also to tune out the inductance of any connections made to antennas. Capacitor 720 provides a short to the supply voltage VDD at RF frequencies. This places transmission line 722 in parallel with the gate terminal of transistor 708 so as to resonate out the input capacitance of transistor 708.

The above embodiments of the present invention are illustrative and not limitative. The invention is not limited by the type of circuit used to generate various phases of the local oscillator. Nor is the invention limited by the type of circuit used to select the various phases of the local oscillator. The invention is not limited by the type of driver or amplifier. The invention is not limited by the type of RF or IF mixer disposed in the phased-array of the present invention. The invention is not limited to any particular RF, IF or baseband frequency. Nor is the invention limited by the number of paths disposed in the phased-array transmitter. The invention is not limited by the type of integrated circuit in which the present invention may be disposed. Nor is the invention limited to any specific type of process technology, e.g., CMOS, Bipolar, or BICMOS that may be used to manufacture the phased-array transmitter of the present invention. The invention is not limited to homodyne or heterodyne architectures. Other additions, subtractions or modifications are obvious in view of the present invention and are intended to fall within the scope of the appended claims.

What is claimed is:

1. An N-element phased-array transmitter comprising:

an input for a local oscillator supplying a plurality of M phases, wherein each element of the phased-array transmitter further comprises:

a pair of phase selectors each operative to select one of an in-phase and a quadrature phase from among said M-supplied phases of said local oscillator and to supply the selected phases as output signals;

a pair of RF mixers each associated with a different one of the pair of phase selectors and each operative to receive the output signals supplied by its associated phase selectors and to generate a corresponding pair of RF signals using IF signals;

a driver operative to receive and process the generated RF signals supplied by the mixers; and an amplifier operative to amplify the RF signal processed by the driver.

2. The N-element phased-array transmitter of claim 1 further comprising:

a plurality of IF mixers operative to receive in-phase and quadrature phase of a base band signal as well as divided-down phases of the local oscillator to generate the IF signals.

3. The N-element phased-array transmitter of claim 2 wherein each of the M-supplied phases of the local oscillator is a differential signal.

4. The N-element phased-array transmitter of claim 3 wherein the driver disposed in each element comprises two driving stages, each driving stage comprising:

a differential cascode amplifier;

a fixed capacitive load coupled to output terminals of the differential cascode amplifier; and wherein at least one driving stage comprises:

an inductive load coupled to output terminals of the differential cascode amplifier.

5. The N-element phased-array transmitter of claim 4 wherein at least one driving stage further comprises:

at least one variable capacitor coupled between the output terminals of its associated differential cascode amplifier and operative to be switched on and off via a bit supplied by a control logic circuit disposed in the phased-array transmitter.

6. The N-element phased-array transmitter of claim 5 wherein the amplifier disposed in each element comprises first and second amplification stages, wherein each first amplification stage further comprises:

a cascode amplifier;

a resistor and a first capacitor coupled in series and forming a first signal path to an input terminal of the cascode amplifier;

a second capacitor coupled to the input terminal of the cascode amplifier via a second path;

a first transmission line having a first terminal coupled to an output terminal of the cascode amplifier;

a second transmission line having a first terminal coupled to the second terminal of the first transmission line, and a second terminal coupled to a first terminal of a third capacitor; and a third transmission line having a first terminal coupled to the second terminal of the first transmission line; wherein a second terminal of the third transmission line is operative to supply an output signal to an associated second amplification stage of the amplifier.

7. The N-element phased-array transmitter of claim 6 wherein each second amplification stage further comprises:

a cascode amplifier;

a resistor and a first capacitor coupled in series and forming a first signal path to an input terminal of the cascode amplifier;

a second capacitor coupled to the input terminal of the cascode amplifier via a second path;

a first transmission line having a first terminal coupled to an output terminal of the cascode amplifier;

a second transmission line having a first terminal coupled to the first terminal of the first transmission line;

a third transmission line having a first terminal coupled to the input terminal of the cascode amplifier; and a third capacitor having a first terminal coupled to a second terminal of the third transmission line, and a second terminal coupled to supply voltage.

8. The N-element phased-array transmitter of claim 7, wherein each element further comprises a Balun coupled between the amplifier and driver disposed therein.

9. The N-element phased-array transmitter of claim 3 further comprising:

a frequency divider block operative to divide a frequency of the local oscillator and to supply divided-down phases of the local oscillator.

10. The N-element phased-array transmitter of claim 9 further comprising:

a shift register configured to receive input control signals and supply output control signals to the 2N phase selectors.

11. The N-element phased-array transmitter of claim 1 further comprising:

an M-phase oscillator operative to generate the M phases of the local oscillator.

12. The N-element phased-array transmitter of claim 11 wherein said M-phase oscillator comprises a phase-locked loop, said phased-locked loop further comprising:

a voltage controlled oscillator;

a loop filter;

a charge pump;

a phase/frequency detector;

a divide-by-four circuit; and a divide-by-sixty four circuit.

13. The N-element phased-array transmitter of claim 12 wherein said local oscillator has a signal of a frequency of 19.2 GHz and is operative to be locked to a reference clock signal that has a frequency of 75 MHz.

14. The N-element phased-array transmitter of claim 13 wherein said RF signal has a frequency of 24 GHz and said IF signal has a frequency of 4.8 GHz.

15. The N-element phased-array transmitter of claim 1 wherein said N is equal to 4 and said M is equal to 16.

16. The N-element phased-array transmitter of claim 1 wherein said phased-array transmitter is formed on a single semiconductor substrate.

17. A method for generating a directional RF signal of an N-element phased array transmitter comprising:

generating a plurality of M selected phases of a local oscillator;

selecting for use at each phase element of said phased array transmitter one of N first and second arbitrary phases of said local oscillator;

generating first and second signal components of an IF signal;

shifting the phase of the first component of the IF signal in accordance with a different one than selected of the first one of the N arbitrary phases of the local oscillator;

shifting the phase of the second component of the IF signal in accordance with a different one than selected of the second one of N arbitrary phases of the local oscillator;

repeating each of the shifting steps N times;

upconverting the frequency of each of the received IF signals so as to generate N RF signals each having a frequency higher than the IF frequency and a phase that is the phase of a different one of the N phase-shifted RF signals;

passing at least one of the N-generated RF signals through a driver comprising a differential cascode amplifier;

passing at least one of the N-generated RF signals through an amplifier having two stages, wherein each stage comprises a differential cascode amplifier.

18. The method of claim 17 further comprising:

amplifying each of the N generated RF signals.

* * * * *